United States Patent
Nellums

[11] Patent Number: 5,901,824
[45] Date of Patent: *May 11, 1999

[54] SYNCHRONIZER INCLUDING RADIALLY-MOVEABLE SELF-ENERGIZING MEMBER

[75] Inventor: Richard A. Nellums, Farmington Hills, Mich.

[73] Assignee: Eaton Corporation, Cleveland, Ohio

[ * ] Notice: This patent is subject to a terminal disclaimer.

[21] Appl. No.: 08/908,091

[22] Filed: Aug. 11, 1997

[51] Int. Cl.⁶ ..................................................... F16D 23/06
[52] U.S. Cl. ................................. 192/53.31; 192/53.331; 74/339
[58] Field of Search ............................... 192/53.3, 53.31, 192/53.33, 53.331, 53.332, 53.36, 48.91; 74/339

[56] References Cited

U.S. PATENT DOCUMENTS

| | | | |
|---|---|---|---|
| 1,923,386 | 8/1933 | Murray | 192/53.31 |
| 2,993,579 | 7/1961 | Altmann | 192/53.31 X |
| 3,362,244 | 1/1968 | Ivanchich | 192/53.31 X |
| 4,462,489 | 7/1984 | Morscheck | 192/53.332 |
| 4,576,264 | 3/1986 | Lupo et al. | 192/48.91 |
| 5,078,245 | 1/1992 | Nellums et al. | 192/53.332 |
| 5,092,439 | 3/1992 | Reynolds | 192/53.331 |
| 5,638,930 | 6/1997 | Parsons | 74/339 X |
| 5,713,447 | 2/1998 | Skotnicki et al. | 192/53.31 |

FOREIGN PATENT DOCUMENTS

| | | | |
|---|---|---|---|
| 1098824 | 2/1961 | Germany | 74/339 |
| 45-27483 | 9/1970 | Japan . | |
| 2 142 390 | 1/1985 | United Kingdom | 192/53 E |

*Primary Examiner*—Charles A Marmor
*Assistant Examiner*—Scott Lund
*Attorney, Agent, or Firm*—Paul S. Rulon; Howard D. Gordon

[57] ABSTRACT

A pin-type, double-acting synchronizer (10) with friction rings (22, 36 and 24, 38), jaw members (30, 26, 28), three circumferentially spaced pins (40) including blocker shoulders for preventing asynchronous engagement of the jaw members, pre-energizer assemblies (42) to ensure initial engagement of the friction rings and blocker shoulders in response to initial engaging movement of a shift flange (32), and self-energizing cams (32f, 32g, 20e, 20f) producing an additive axial force ($F_a$) in response to either of the cams (32f, 32g) moving a link (48) radially inward against either of the cams (20e, 20f). The synchronizer may include springs (50) to limit the additive axial force ($F_a$) and curved ramps (20e', 20f') to vary the additive axial force ($F_a$).

35 Claims, 2 Drawing Sheets

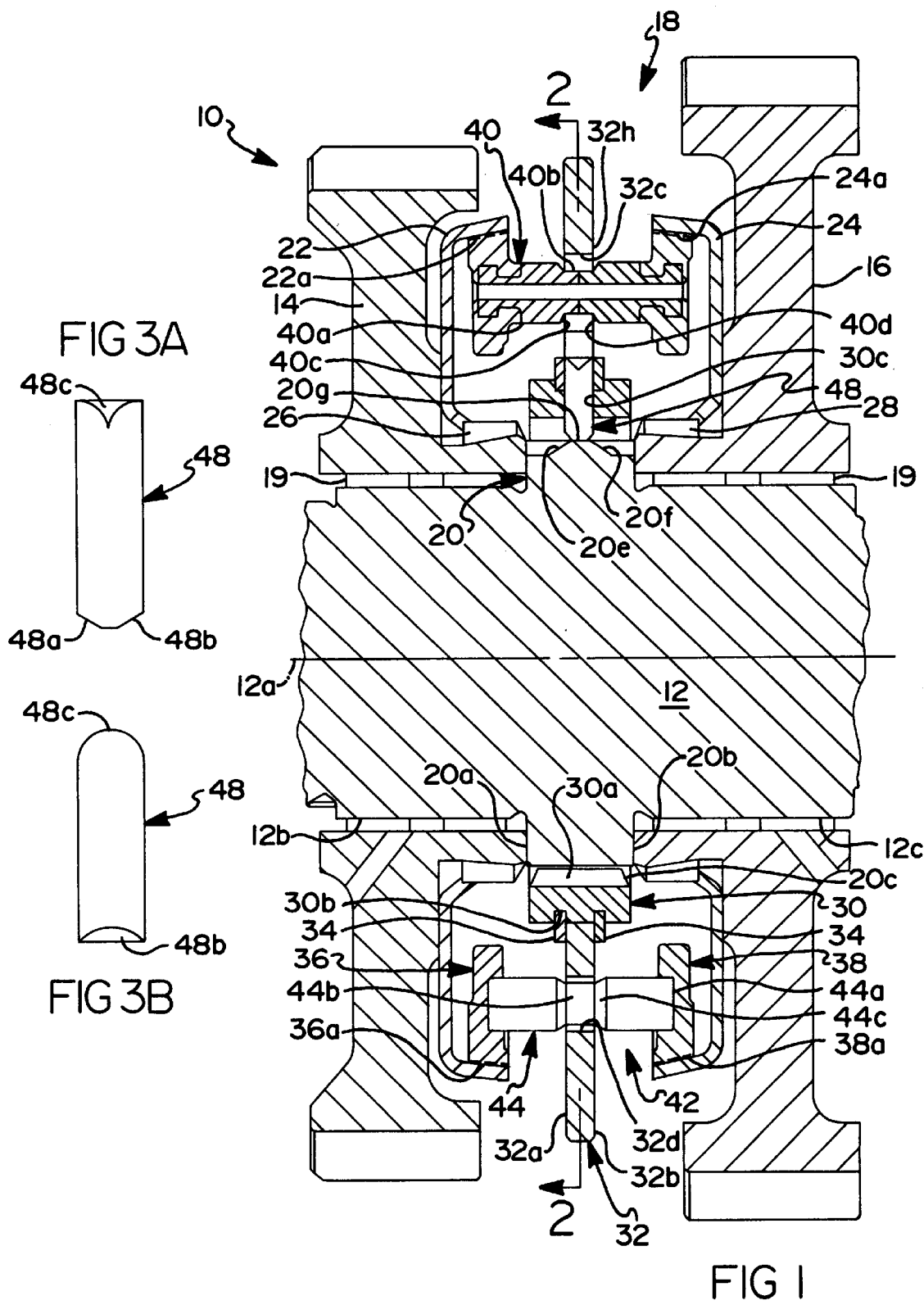

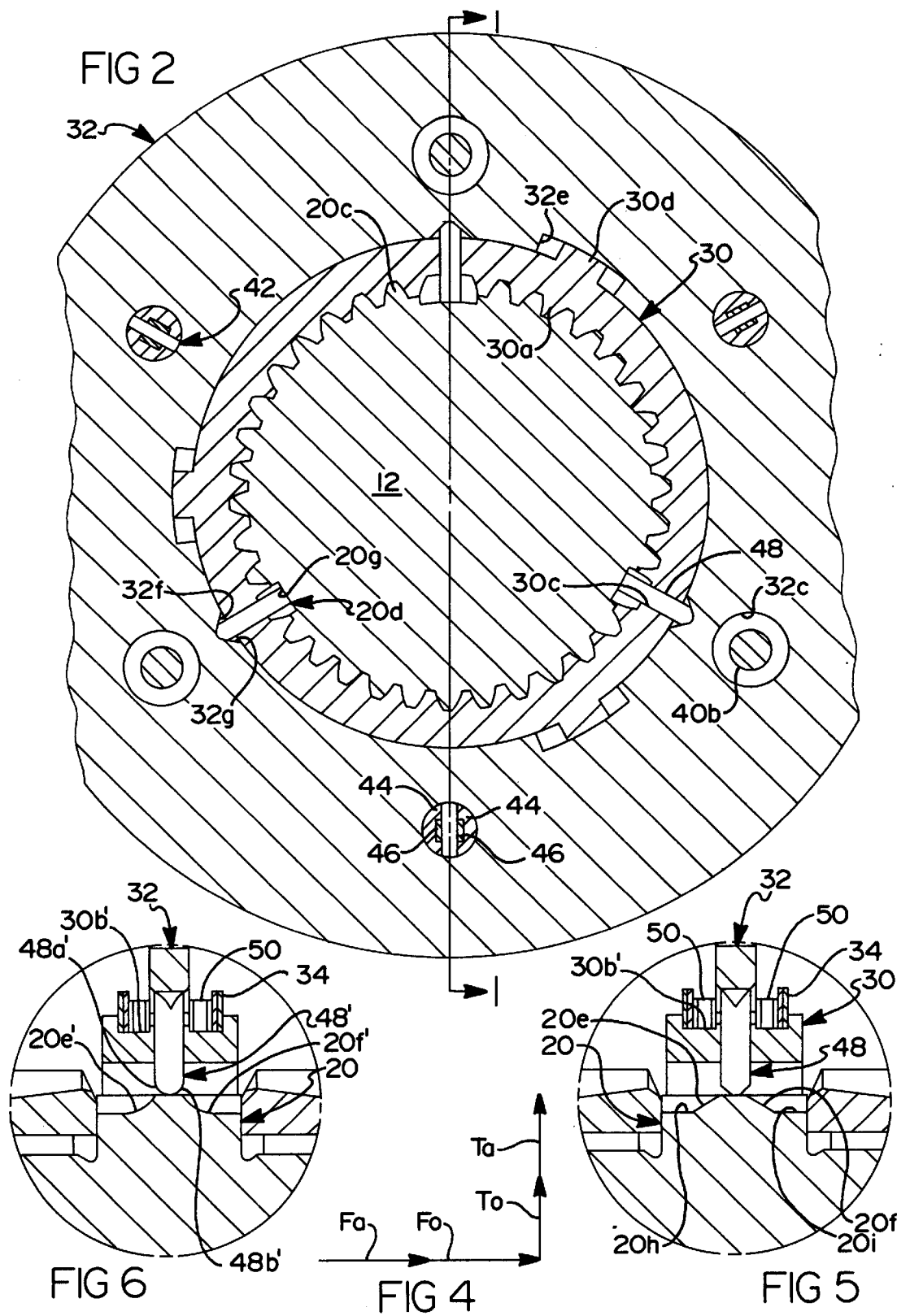

SYNCHRONIZER INCLUDING RADIALLY-MOVEABLE SELF-ENERGIZING MEMBER

CROSS-REFERENCE TO RELATED APPLICATION

This application, having attorney docket number 95-rELT-217, relates to U.S. application Ser. Nos. 08/908,087; 08/908,086; 08/908,093; 08/908,092, 08/908,090; filed Aug. 11, 1997, and respectively having attorney docket numbers 95-rTRN-406, 91-TNR-499, 94-rELT-154 94rELT-247 and 97-rTRN-259, and all assigned to the assignee of this application.

FIELD OF THE INVENTION

This invention relates to a synchronizer for a transmission.

BACKGROUND OF THE INVENTION

It is well known that synchronizers may be used in multiple speed ratio transmissions to assist shifting all or some of the transmission gear ratios. It is also known that the shift effort and/or time required to perform a shift may be reduced by use of synchronizers of the self-energizing or boost type. Since required operator shift effort generally increases with vehicle size, synchronizers of the self-energizing type are especially useful in transmissions for heavy duty trucks and/or in transmissions where reduced shift time and/or reduced shift effort are preferred. Prior art examples of synchronizers that may be relevant to the synchronizer herein may be seen by reference to U.S. Pat. Nos. 5,078,245; 5,092,439; Japanese Patent Publication (Kokoku) 45-27483; and German Patent Publication 1,098,824 which are incorporated herein by reference.

SUMMARY OF THE INVENTION

An object of this invention is to provide a synchronizer with improved selfenergizing means.

According to the invention, a synchronizer, as disclosed in Japanese Patent Publication 45-27483 and representing the prior art as referred to in the pre-characterizing portion of claim 1, includes a synchronizer for frictionally synchronizing and positive connecting first and second drives disposed for relative rotation about a common axis. The synchronizer comprises first jaw means axially movable into engagement with second jaw means for positive connecting the drives in response to engaging movement of first jaw means by an axially directed shift force ($F_o$). Connecting means connect the first jaw means for axial and nonrotational movement relative to the first drive. First friction means are axially movable into engagement with second friction means in response to the engaging movement of the first jaw means for producing a synchronizing torque. Blocker means are movable into engagement in response to the engaging movement of the first jaw means for preventing asynchronous engagement of the jaw means and for transmitting the shift force ($F_o$) to the first friction means to effect an engagement force on the friction means. Self-energizing means are operative to react the synchronizing torque for producing an additive axial force $F_a$) in the direction of the shift force ($F_o$) for increasing the engagement force on the friction means.

The improvement is characterized by the self-energizing means including a link mounted for limited radial movement relative to the axis. A first member is mounted for limited rotational movement relative to the first drive in response to the synchronizing torque for effecting radial movement of the link in response to the limited rotational movement. A second member produces the additive axial force ($F_a$) in the direction of the shift force ($F_o$) in response to the radial movement of the link.

DESCRIPTION OF THE DRAWINGS

The synchronizer of the invention is shown in the accompanying drawings in which:

FIG. 1 illustrates a double-acting synchronizer in a neutral position and sectioned along line 1—1 of FIG. 2;

FIG. 2 illustrates the synchronizer of FIG. 1 sectioned along line 2—2 of FIG. 1;

FIGS. 3A and 3B illustrate two enlarged views of a component in FIGS. 1 and 2 respectively viewed perpendicular and parallel to an axis of the shaft therein;

FIG. 4 is a graphical representation of axial forces and torques acting on a shift flange of the synchronizer; and FIGS. 5 and 6 illustrate modified embodiments of self-energizing components in FIGS. 1 and 2.

The drawings are simplified by omitting background lines of components therein.

DETAILED DESCRIPTION OF THE DRAWINGS

The term "synchronizer", used herein, shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing friction clutch in relation to the synchronizing torque of the friction clutch.

Looking now at FIGS. 1, 2, 3A and 3B, therein is shown a gear and synchronizer assembly 10 including a drive or shaft 12 to be mounted for rotation in a transmission about an axis 12a, axially spaced apart drives or gears 14, 16, and a double-acting synchronizer 18.

The shaft 12 includes cylindrical surfaces 12b, 112c rotatably supporting the gears thereon via bearings 19 and an annular member 20 having an outer circumference greater in diameter than the diameters of the cylindrical surfaces. The annular member has an axial length separating the gears via axially oppositely facing shoulders 20a, 20b which limit axial movement of the gears toward each other. Axial movement of the gears away from each other is limited in any of several known manners. The annular member may be formed of a ring affixed to the shaft or, as herein, formed integral with the shaft. The outer circumference of the annular member includes external splines 20c formed therein and three recesses 20d of axial length equal to the axial length of the annular member and self-energizing cams 20e, 20f, explained further hereinafter. Each recess may be formed by removing all or part of a spline 20c.

The synchronizer mechanism 18 includes friction rings 22, 24 and jaw members 26, 28 affixed to gears 14,16, an axially movable jaw member 30 having internal spline teeth 30a slidably mating continuously with the external spline teeth 20c formed in the outer circumference of annular member 20, a radially extending shift flange 32 having axially oppositely facing sides 32a, 32b sandwiched between axially facing sides of retainers 34 disposed in annular grooves 30b in jaw member 30, axially movable annular friction rings 36, 38 rigidly secured together by three circumferentially spaced apart pins 40 extending axially from each of the friction rings and through openings 32c in the flange, and three pre-energizer assemblies 42 shown in relief in FIG. 1. In the embodiment of FIGS. 1 and 2 retainers 34 prevent axial movement between jaw member 30 and flange 32, and allow relative rotation therebetween.

The friction rings include cone friction surfaces 22a, 36a and 24a, 38a that engage for frictionally synchronizing the gears to the shaft prior to engagement of the jaw members. A wide range of cone angles may be used; cone angles of seven and one-half degrees may be used for the synchronizer herein. The friction surfaces 36a, 38a and/or 22a, 24a may be defined by any of several known friction materials affixed to the base member; herein, pyrolytic carbon friction materials, such as disclosed in U.S. Pat. Nos. 4,700,823; 4,844,218; and 4,778,548, are preferred. These patents are incorporated herein by reference.

Pins 40 each include major diameter portions 40a having diameters slightly less than the diameter of flange openings 32c, a reduced diameter or groove portion 40b spaced between friction rings 36, 38 (herein midway), and conical blocker shoulders or surfaces 40c, 40d extending radially outwardly from the pin axis and axially away from each other at angles relative to a plane normal to the pin axis. The grooved portions, when disposed within their respective flange openings, allow limited rotation of the rigid friction ring and pin assembly relative to the flange to effect engagement of the pin blocker shoulders with chamfered blocker shoulders 32h defined about the flange openings 32c. The pins may be rigidly secured to friction rings 36, 38 in any of several known manners.

The pre-energizer assemblies 42 may be any of several types, herein they are of the split pin-type which are more completely shown and described in U.S. Pat. No. 5,339,936. Each pre-energizer assembly extends axially between the friction rings 36, 38 and through one of openings 32d in the shift flange. The openings 32d are alternately spaced between openings 32c. It should suffice herein to mention that each pre-energizer assembly includes two shells 44 having ends 44a and at least two leaf springs 46 sandwiched between and biasing the shells apart. Each pair of shells 44 forms a major diameter less than the diameter of its associated opening 32d when squeezed together, an annular groove 44b with chamfered end surfaces 44c, and the ends 44a. As is known, ends 44a react against friction rings 36, 38 and chamfers 44c react against chamfers about opening 32d in flange 32 in response to initial engaging movement of flange 32, thereby effecting initial engaging movement of the friction clutches and initial torque for rotating pins 40 relative to flange 32 and positioning the blocker shoulders for engagement.

As previously mentioned, jaw member 30 includes internal spline teeth 30a which slidably mate with external spline teeth 20c of member 20 affixed to the shaft. The external splines have flank surfaces extending parallel to the shaft axis and the mating thereof with flank surfaces of the jaw member splines prevents relative rotation therebetween. Jaw member 30 further includes three radially extending openings 30c each having a self-energizing link 48 slidably extending therethrough, and three lugs 30d on the outer periphery thereof and extending radially outward into recesses 32e in the inner periphery of flange 32. The lugs and recesses define stops for limiting the amount of relative rotation between flange 32 and jaw member 30 which is rotationally fixed to shaft 12. Links 48 are shown in relief in all of the figures. Each recess has a circumferential length greater than the circumferential length of the lug therein for allowing limited relative rotation between flange 32 and jaw member 30 to effect actuation of the self-energizing mechanism.

Flange 32 further includes three pairs of cam surfaces 32f, 32g in the inner periphery thereof for moving the links 48 radially inward against either cam surface 20e or 20f for reacting synchronizing torque between the cone clutches and shaft to provide an additive axial self-energizing force for increasing the engaging force of the cone clutches initially engaged by a shift force applied to flange 32, thereby increasing the synchronizing torque provided by the cone clutches. Ramp or cam follower surfaces 48a, 48b on link 48 respectively react against cam surfaces 20f, 20e to provide the additive axial force for respectively increasing synchronizing torque of gears 16, 14 for upshift and downshift in response to the relative rotation of the flange respectively engaging cam surfaces 32f, 32g with a cylindrical ramp or cam follower surface 48c of link 48. The cam surfaces, as shown herein, provide increasing synchronizing force for both gears and for increasing synchronizing force for up and down shifts. The cam surfaces 20e, 20f may be formed such that a first imaginary line in each surface thereof lies in an imaginary plane parallel to the shaft axis 12a and a second imaginary line in each surface thereof forms a right angle to both the first imaginary line and the imaginary plane parallel to the axis. The cam follower surfaces 48a, 48b may be formed according to the same rules as cam surfaces 20e, 20f. The cam surfaces 32f, 32g may be formed such that a first imaginary line in the surface thereof lies in an imaginary plane perpendicular to the shaft axis 12a, and a second imaginary line in the surface forms a right angle to both the first imaginary line and the imaginary plane perpendicular to the axis. The cam follower surface 48c may be formed according to the same rules as cam surfaces 32f, 32g. The first imaginary line in all or some of the cam surfaces may be curved as shown hereinafter for cam surfaces 20e', 20f' on member 20 in FIG. 6.

When the flange 32 is in the neutral position of FIG. 1, reduced diameter portions 40b of pins 40 are aligned with flange openings 32c, friction surfaces of the cone clutches are slightly spaced apart and are maintained in a spaced apart relation by the chamfered or angled pre-energizer surfaces 44c of the pre-energizers 42 acting on the pre-energizer chamfered surfaces about flange openings 32d by the force of springs 46, and links 48 are aligned for contact with axially extending flats 20g between cams 20e, 20f. The flats 20g and axial force provided by the pre-energizer surfaces prevent self-energizing and inadvertent engagement of the synchronizer due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 32 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 32 in an axial direction and is represented by the length of arrow $F_o$ in FIG. 4.

Initial rightward axial movement of flange 32 by the operator shift force $F_o$ is transmitted to pre-energizer surfaces 44c to effect initial frictional engagement of cone surface 38a with cone surface 24a. The initial engagement force on the cone surface is of course a function of the force of springs 46 and the angles of the pre-energizer surfaces. The initial frictional engagement (provided an asynchronous condition exists and momentarily ignoring the effect of the self-energizing cams) produces an initial cone clutch engaging force and initial synchronizing torque which ensures limited relative rotation between flange 32 and the engaged friction ring, and hence, movement of the reduced diameter pin portions 40b to the appropriate sides of the flange openings 32c to provide engagement of pin blocker shoulders 40d with the blocker shoulders 32h disposed about openings 32c. When the blocker shoulders are engaged, the full operator shift force $F_o$ on flange 32 is transmitted to friction ring 38 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 4. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins 40 into concentric relation with openings 32c to allow continued axial movement of the flange and engagement of the internal spline/jaw teeth 30a of jaw member 30 with external spline/jaw teeth of jaw member 28 of gear 16. The spline/jaw teeth may be configured as shown in U.S. Pat. Nos. 3,265,173 and 4,246,993 which are incorporated herein by reference.

Still ignoring the effects of the self-energizing ramps, cone clutch torque provided by the force $F_o$ is expressed by equation (1).

$$T_o = F_o R_c \mu_c / \sin \alpha \quad (1)$$

where:
$R_c$=the mean radius of the cone friction surface,
$\mu_c$=the coefficient of friction of the cone friction surface, and
$\alpha$=the angle of the cone friction surfaces.

Looking now at the affects of the self-energizing cams, the synchronizing torque $T_o$, due to the operator applied axial shift force $F_o$, is of course transmitted to flange 32 by pins 40 and is reacted to shaft 12 across the self-energizing cam surfaces via links 48. The self-energizing cam surfaces, when engaged, produce the axial additive force $F_a$ acting on the flange in the same direction as shift force $F_o$. The axial additive force $F_a$ is applied to the engaged friction surfaces through the blocker surfaces via a force path including link 48 reacting axially against jaw clutch opening 30c, the retainer ring 34, and the flange 32. The forces $F_o$ and $F_a$ are applied to shift flange 32 in parallel and sum to provide a total force $F_t$, thereby further increasing the engaging force of the cone clutch to provide an additive synchronizing torque $T_a$ which adds to the torque $T_o$ to provide a total torque $T_t$. The sum of the axial forces for engaging the cone clutch are $F_o$ plus $F_a$ and the sum of the synchronizing torques being produced by the cone clutch are $T_o$ plus $T_a$, as graphically shown in FIG. 4. For a given operator shift force $F_o$ and an operator synchronizing torque $T_o$, the magnitude of the axial additive force is preferably a function of the angles of the engaged self-energizing ramp surfaces. These angles are preferably great enough to produce an additive force $F_a$ of magnitude sufficient to significantly increase synchronizing torque and decrease synchronizing time in response to a given moderate shift effort by the operator. However, these angles are also preferably low enough to produce a controlled axial additive force $F_a$, i.e., the force $F_a$ should preferably increase or decrease in response to the force $F_o$ increasing or decreasing. If the ramp angles are too great, the ramps are self-locking rather than self-energizing; hence, once initial engagement of the cone clutch is effected the force $F_a$ will rapidly and uncontrollably increase independent of the force $F_o$, thereby driving the cone clutch toward uncontrolled lockup. Self-locking rather than self-energizing decreases shift quality or shift feel, may over stress synchronizer components, and may cause over heating and rapid wear of the cone clutch surfaces.

The main variables and equations for calculating self-energizing ramp angles may be seen by reference to previously mentioned U.S. Pat. No. 5,092,439.

FIG. 5 illustrates a modified portion of the synchronizer for resiliently limiting the maximum value of the additive axial force $F_a$ that the cam surfaces can produce. The modified portion includes providing jaw member 30 with axially wider grooves 30b' and positioning a resilient member, such as a wave spring 50, between the retainers 34 and the sides 32a,32b of flange 32. When cam surfaces 20e,20f are straight, as in FIGS. 1 and 2, the wave springs allow sufficient axial movement of jaw member 30 and links 48 for ramps 48a,48b to move into a force balance position at the intersection of cams 20e,20f with flats 20h,20i. When in this position, the maximum additive axial force $F_a$ is limited to the force transmittable by the spring at the balance position since any additional movement of ramps 48a,48b on to the flats generates no additive axial force.

FIG. 6 illustrates a modification of the embodiment in FIG. 5, therein member 20 is provided with curved cam surfaces 20e',20f' in lieu of flat cams 20e,20f. The curved cams have progressively reduced angles relative to shaft axis 12a and therefore provide progressively less additive axial force per unit of force applied thereto by link 48. This embodiment allows the beginning angles of the curved cams to be greater and therefore provide greater initial additive axial forces that decrease as ramps 48a,48b move along the curved surfaces and also provides for reduction of the additive axial forces with less flexing of the springs. The link 48' in FIG. 6 is provided with curved cam/ramp surfaces 48a',48b' in lieu of the flat cam/ramp surfaces 48a,48b of link 48 in FIGS. 3A, 3B. The radius of curvature of curved cam surfaces 48a',48b' is less than the radius of cam surfaces 20e,20f or 20e',20f', thereby allowing the same link to be used with several different curved cam surface angles 20e', 20f' or 20e,20f. The radius of curvature of cam surfaces 20e,20f is of course infinite.

A pin-type synchronizer with alterative embodiments has been disclosed to illustrate inventive subject matter herein. The following claims are intended to cover inventive portions of the disclosed subject matter and variations and modifications believed to be within the spirit of the invention.

What is claimed is:

1. A synchronizer for frictionally synchronizing and positive connecting first and second drives disposed for relative rotation about a common axis; the synchronizer comprising:

first jaw means axially movable into engagement with second jaw means for positively connecting the drives in response to engaging movement of the first jaw means by an axially directed shift force ($F_o$);

connecting means connecting the first jaw means for axial and nonrotation movement relative to the first drive;

first friction means axially movable into engagement with second friction means in response to the engaging movement of the first jaw means for producing synchronizing torque ($T_o$);

blocker means movable into engagement in response to the engaging movement of the first jaw means for preventing asynchronous engagement of the jaw means and for transmitting the shift force ($F_o$) to the first friction means to effect and engagement force of the friction means; and self-energizing means operative to react the synchronizing torque for producing an additive axial force ($F_a$) in the direction of the shift force ($F_o$) for increasing the engagement force of the friction means; characterized by:

the self-energizing means including a link mounted for limited radial movement relative to the axis, a first member mounted for limited rotational movement relative to the first jaw means and the first drive in response to the synchronizing torque for effecting radial movement of the link in responded to the limited rotational movement, a second member for producing the additive axial force ($F_a$) in the direction of the shift force ($F_o$) in response to the radial movement of the line, and the additive axial force ($F_a$) transmitted to the first friction means via serial force path including the first jaw means.

2. The synchronizer of claim 1, wherein:

the first member includes a first cam surface for effecting the radial movement of the link, the first cam surface effects radially inward movement of the link in response to the limited rotational movement, the first cam surface positioned such that first and second imaginary lines in the surface thereof are at right angles to each other and the first imaginary lines are parallel to an imaginary plane normal to the axis.

3. The synchronizer of claim 2, wherein:

the second imaginary lines are parallel to the axis.

4. The synchronizer of claim 2, wherein:

the second member includes a second cam surface for applying the additive axial force ($F_a$) to the friction means through the link in response to the radially inward movement of the link.

5. The synchronizer of claim 4, wherein:

the second member second cam surface positioned such that first and second imaginary lines in the surface thereof and at right angles to each other are substantially, respectively at right angles to and parallel to the imaginary plane, and the first imaginary lines in the second member second cam surface are at an oblique angle to the axis.

6. The synchronizer of claim 5, wherein:

the link includes a curved ramp surface that contacts the second cam surface in response to the radially inward movement of the link, the curved ramp surface of the link having a radius of curvature less than a radius of curvature of the second cam surface.

7. The synchronizer of claim 1, further including:

force limiting means for limiting the magnitude of the additive axial force ($F_a$).

8. The synchronizer of claim 7, wherein:

the force limiting means includes resilient means interposed in the force path between the blocker means and the link and operative to flex in response to the additive axial force ($F_a$) for limiting the magnitude of the additive axial force ($F_a$).

9. The synchronizer of claim 8, wherein:

the first member includes a first cam surface for effecting the radial movement of the link, the first cam surface effects radial inward movement of the link in response to the limited rotational movement, the first cam surface positioned such that first and second imaginary lines in the surface thereof are at right angles to each other and the first imaginary lines are parallel to an imaginary plane normal to the axis.

10. The synchronizer of claim 9, wherein:

the second imaginary lines are parallel to the axis.

11. The synchronizer of claim 9, wherein:

the second member includes a second cam surface for applying the additive axial force ($F_a$) to the link in response to the radially inward movement of the link.

12. The synchronizer of claim 11, wherein:

the second member second cam surface positioned such that first and second imaginary lines in the surface thereof and at right angles to each other are substantially, respectively at right angles to and parallel to the imaginary plane, and the first imaginary lines in the second cam surface are at an oblique angle to the axis.

13. The synchronizer of claim 12, wherein:

the link includes a ramp that contacts the second cam surface in response to the radially inward movement and moves axially along the second cam surface in response to increasing the additive axial force ($F_a$) flexing the resilient means.

14. The synchronizer of claim 13, wherein:

the oblique angle of the second cam surface changes relative to the axis as the link ramp moves therealong in response to increased flexing of the resilient means.

15. The synchronizer of claim 13, wherein:

the oblique angle of the second cam surface decreases relative to the axis as the ramp moves therealong in response to increased flexing of the resilient means.

16. The synchronizer of claim 15, wherein:

the link includes a curved ramp surface that contacts the second cam surface in response to the radially inward movement of the link, the curved ramp surface of the link having a radius of curvature less than a radius of curvature of the second cam surface.

17. A synchronizer for frictionally synchronizing and positively connecting first and second drives disposed for relative rotation about a common axis; the synchronizer comprising;

first jaw means axially moveable into engagement with second jaw means for positively connecting the drives in response to engaging movement of the first jaw mean by an axially directed shirt force ($F_o$);

connecting means connecting the first jaw means for axial and nonrotational movement releative to the first drive;

first friction means axially movable into engagement with second friction means in response to the engaging movement of the first jaw means for producing synchronizing torque ($T_o$);

blocker means movable into engagement in response to the engaging movement of the first jaw means for preventing asynchronous engagement of the jaw means and for transmitting the shift force ($F_o$) to the first friction means to effect an engagement force of the friction means; and self-energizing means operative to react the synchronizing torque for producing an additive axial force ($F_a$) in the direction of the shift force ($F_o$) for increasing the engagement force of the friction means; characterized by:

the self-energizing means including a link mounted for limited radial movement relative to the axis, a first member mounted for limited rotational movement relative to the first jaw means and the first drive in response to the synchronizing torque for effecting radial movement of the link in response to the limited rotational movement, and a second member for producing the additive axial force ($F_a$) in the direction of the shift force ($F_o$) in response to the radial movement of the link;

the first member including a first cam surface for effecting the radial movement of the link, the first cam surface effecting radially inward movement of the link in response to the limited rotational movement, the first cam surface positioned such that first and second imaginary lines in the surface thereof are at the right angles to each other and the first imaginary lines are parallel to an imaginary plane normal to the axis;

the first member being a radially extending flange concentric to the axis and moved axially by the shift force, the first cam surface being a radially inwardly facing cam surface for effecting the radially inward movement of the link in response to the limited rotational movement;

retainer means connecting the flange for axial movement with the first jaw means;

the blocker means including at least first and second blocker surfaces, the first blocker surface defined by a pin member rigidly extending axially for the first friction means and into an opening in the flange, the second blocker surface defined about the opening;

the second member including a second cam surface affixed to the first drive;

the first jaw means including a radially extending opening having the link disposed therein and between the first and second cam surfaces; and the link operative, when moved radially inward by the first cam surface and against the second can surface, to transmit the additive axial force ($F_a$) to the first friction means via a force path including the first jaw means, the flange and the blocker surfaces.

18. The synchronizer of claim 17, wherein:

resilient means is axially interposed between the first jaw means and the flange for limiting the magnitude of the additive axial force ($F_a$).

19. The synchronizer of claim 18, wherein:

the second cam surface has an oblique angle relative to the axis and the oblique angle decreases as the link moves therealong in response to increased flexing of the resilient means.

20. A synchronizer for frictional and positive connection of first and second drives disposed for relative rotation about a common axis; the synchronizer comprising:

a first jaw member nonrotatable relative to the first drive and axially movable relative to the drives from a neutral position to an engaged position with a second jaw member for positively connecting the drives in response to engaging movement of the first jaw member by an axially directed shift force ($F_o$) moving a shift member toward the second jaw member;

a retainer means connecting the shift member for axial movement with the first jaw member;

a first friction member axially movable into engagement with a second friction member in response to an initial portion of the engaging movement of the first jaw member for producing an initial synchronizing torque;

blocker surfaces movable into engagement in response to the initial synchronizing torque for preventing asynchronous engagement of the jaw members for transmitting the shift force ($F_o$) to effect an engagement force of the friction members, and for producing a torque counter to the synchronizing torque for moving the blocker surfaces out of engagement as synchronization is reached; and a relative rotation mechanism allowing limited rotation of the shift member relative to the first law member and the first drive and including at least first and second self-energizing cam surfaces for reacting the synchronizing torque between the shift member and the first drive to produce and additive force ($F_o$) directed across the blocker surfaces in the direction of the shift force ($F_o$) for increasing the engagement force of the friction members;

characterized by:

the relative rotation mechanism having the first cam surface affixed to the shift member and the second cam surface affixed to the first drive, the relative rotation mechanism further including a radially movable link interposed between the cam surfaces and, the first cam surface for biasing the link radially inward into engagement with the second cam surface with a radial force proportional to the synchronizing torque in response to the synchronizing torque causing the limited rotation of the shift member relative to the first jaw member and the first drive, the second cam surface for vectoring the radial force axially in the direction of the shift force ($F_o$)for producing the additive axial force ($F_a$) and the additive axial force ($F_a$) directed to the friction members via a force path including the link, the first jaw member, the retainer means, the shift member and the blocker surfaces.

21. The synchronizer of claim 20, wherein:

the link includes a curved ramp surface that contacts the second cam surface in response to the radially inward movement of the link, the curved ramp surface of the link having a radius of curvature less than a radius of curvature of the second cam surface.

22. The synchronizer of claim 20, including:

resilient means disposed in the force path for limiting the additive axial force applied to the friction members.

23. The synchronizer of claim 22, wherein:

the resilient means is positioned in the force path in parallel with the shift force ($F_o$).

24. The synchronizer of claim 22, wherein:

the resilient means is interposed between the first jaw member and the shift member.

25. The synchronizer of claim 24, wherein:

the second cam surface has an oblique angle relative to the axis and the oblique angle decreases as the link moves therealong in response to increased flexing of the resilient means.

26. The synchronizer of claim 25, wherein:

the link includes a curved ramp surface that contacts the second cam surface in response to the radially inward movement of the link, the curved ramp surface of the link having a radius of curvature less than a radius of curvature of the second cam surface.

27. A synchronizer for frictional and positive connection of first and second drives disposed for relative rotation about a common axis; the synchronizer comprising:

a first jaw member rotatable with the first drive and axially movable relative to the drives from a neutral position to an engaged position with a second jaw member for positively connecting the drives in response to engaging movement of the first jaw member by an axially directed shift force ($F_o$) moving a radially extending flange toward the second jaw member;

a retainer assembly connecting the flange for axial movement with the first jaw member;

a first friction member axially movable into engagement with a second friction member in response to an initial portion of the engaging movement of the first jaw member for producing an initial synchronizing torque;

first and second blocker surfaces movable into engagement in response to the initial synchronizing torque for preventing asynchronous engagement of the jaw members, for transmitting the shift force ($F_o$) to effect an engagement force of the friction members, and for producing a torque counter to the synchronizing torque for moving the blocker surfaces out of engagement as synchronization is reached, the first blocker surfaces defined by a plurality of circumferentially spaced pin members rigidly extending axially from the first friction member and into openings in the flange, the second blocker surfaces defined about the openings, and the pin members operative to transmit the synchronizing torque to the flange; and a relative rotation mechanism allowing limited rotation of the flange relative to the first jaw member and the first drive and including at least first and second self-energizing cam surfaces operative when reacting the synchronizing torque between the flange and the first drive to produce and additive axial force ($F_a$) applied to the flange in the direction of the shift force ($F_o$) for increasing the engagement force of the friction members;

characterized by:

the relative rotation mechanism having the first cam surface affixed to the flange and the second cam surface affixed to the first drive, the relative rotation mechanism further including a radially extending opening in the first jaw member and a radially movable link disposed in the opening and interposed between the cam surfaces, the first cam surface for biasing the link radially inward into engagement with the second cam surface with a radial force proportional to the synchronizing torque in response to the synchronizing torque causing the limited rotation of the flange relative to the first law member and the first drive, the second cam surface for vectoring the radial force axially in the direction of the shift force ($F_o$) to produce the additive force ($F_a$), and the additive force directed to the friction members via a force path including the link, the first jaw member, the retainer means, the flange and the blocker surfaces.

28. The synchronizer of claim 27, wherein:

the link includes a curved ramp surface that contacts the second cam surface in response to the radially inward movement of the link, the curved ramp surface of the link having a radius of curvature less than a radius of curvature of the second cam surface.

29. The Synchronizer of claim 27, including:

resilient means disposed in the force path for limiting the additive force applied to the friction members.

30. The synchronizer of claim 29, wherein:

the resilient means is interposed between the first jaw member and the flange.

31. The synchronizer of claim 30, wherein:

the second cam surface has an oblique angle relative to the axis and the oblique angle decreases as the link moves therealong in response to increased flexing of the resilient means.

32. A synchronizer for frictionally synchronizing and positively connecting first and second drives disposed for relative rotation about a common axis; the synchronizer comprising:

first jaw means axially movable into engagement with second jaw means for positively connecting the drives in response to engaging movement of the first jaw means by an axially directed shift force ($F_o$);

first friction means axially movable into engagement with second friction means in response to the engaging movement of the first jaw means for producing a synchronizing torque;

blocker means movable into engagement in response to the engaging movement of the first jaw means for preventing asynchronous engagement of the jaw means and for transmitting the shift force ($F_o$) to the first friction means to effect an engagement force of the friction means;

first and second cam surfaces engagable in response to the synchronizing torque for producing and additive force ($F_a$) transmitted to the friction means in the direction of the shift force ($F_o$) via a force path including the blocker means for increasing the engagement force of the friction means; and resilient means for limiting the magnitude of the additive axial force ($F_a$) and disposed in the force path; characterized by:

the force path including the first law means;

means connecting the first jay means for axial and nonrotational movement relative to the first drive;

one of the cam surfaces being operative to move radially along another other cam surfaces in response to flexing of the resilient means;

the other cam surface having a cam angle that varies as the one cam surface moves radially therealong for changing the magnitude of the additive axial force ($F_a$); and the resilient means being interposed in the force path between the blocker means and at least open of the first and second cam surfaces.

33. The synchronizer of claim 32, wherein:

the cam angle of the other cam surface decreases relative to the axis as the one cam moves therealong in response to increased flexing of the resilient means.

34. The synchronizer of claim 33, wherein:

the one cam surface has a radius of curvature less than a radius of curvature of the other cam surface.

35. A synchronizer for frictionally synchronizing and positively connecting first and second drives disposed for relative rotation about a common axis; the synchronizer comprising:

first jaw means axially movable into engagement with second jaw means for positively connecting the drives in response to engaging movement of the first jaw means by an axially directed shift force ($F_o$);

connecting means connecting the first jaw means for axial and nonrotational movement relative to the first drive;

first friction means axially movable into engagement with second friction means in response to the engaging movement of the first jaw means for producing a synchronizing torque ($T_o$);

blocker means movable into engagement in response to the engaging movement of the first jaw means for preventing asynchronous engagement of the jaw means and for transmitting the shift force ($F_o$) to the first friction means to effect and engagement force of the friction means; and self-energizing means operative to react the synchronizing torque for producing an additive axial force ($F_a$) in the direction of the shift force ($F_o$) for increasing the engagement force of the friction means; characterized by:

the self-energizing means including a link mounted for limited radial movement relative to the axis, a first member mounted for limited rotational movement relative to the first jaw means and the first drive in response to the synchronizing torque for effecting radial movement of the link in response to the limited rotational movement, a second member for producing the additive axial force ($F_a$) in the direction of the shift force ($F_o$) in response to the radial movement of the link and the additive axial force ($F_a$) transmitted to the first friction means via a force path including the first jaw means; and force limiting means including resilient means interposed in the force path between the blocker means and the link and operative to flex in response to the additive axial force ($F_a$) for limiting the magnitude of the additive axial force ($F_a$).

* * * * *